United States Patent
Ristanovic et al.

(10) Patent No.: US 6,775,597 B1
(45) Date of Patent: Aug. 10, 2004

(54) SECURITY CONSTRAINED OPTIMAL POWER FLOW METHOD

(75) Inventors: Petar Ristanovic, Maple Grove, MN (US); Oladiran Obadina, Plymouth, MN (US); Muhamed Aganagic, San Jose, CA (US)

(73) Assignee: Siemens Power Transmission & Distribution, Wendell, NC (US)

(*) Notice: Subject to any disclaimer, the term of this patent is extended or adjusted under 35 U.S.C. 154(b) by 0 days.

(21) Appl. No.: 09/273,148

(22) Filed: Mar. 19, 1999

Related U.S. Application Data (60) Provisional application No. 60/085,352, filed on May 13, 1998, provisional application No. 60/085,240, filed on May 13, 1998, and provisional application No. 60/085,364, filed on May 13, 1998.

(51) Int. Cl.$^7$ .......................... G06F 17/10; G06F 19/00
(52) U.S. Cl. .......................... 700/293; 700/297; 703/2; 703/18
(58) Field of Search .................................. 700/293, 294, 700/297, 298; 703/2, 4, 18

(56) References Cited

U.S. PATENT DOCUMENTS

| | | | | |
|---|---|---|---|---|
| 5,195,026 A | * | 3/1993 | Nonaka et al. | 700/47 |
| 5,566,085 A | * | 10/1996 | Marceau et al. | 700/293 |
| 5,625,751 A | * | 4/1997 | Brandwajn et al. | 706/20 |
| 5,642,000 A | * | 6/1997 | Jean-Jumeau et al. | 307/31 |
| 5,703,791 A | * | 12/1997 | Amano et al. | 700/292 |
| 5,719,787 A | * | 2/1998 | Chiang et al. | 700/293 |
| 5,745,368 A | * | 4/1998 | Ejebe et al. | 702/164 |
| 5,796,628 A | * | 8/1998 | Chiang et al. | 700/295 |
| 5,798,939 A | * | 8/1998 | Ochoa et al. | 700/286 |

OTHER PUBLICATIONS

Bertram et al., "An Integrated Package for Real–Time Security Enhancement", Power Industry Computer Application Conference, PICA '89, Conference Papers, May 1–5, 1989, pp. 18–24.*

Lu et al., "Network Constrained Security Control Using an Interior Point Algorithm", IEEE Transactions on Power Systems, vol. 8, No. 3, Aug. 1993, pp. 1068–1076.*

Wu, Y,–C., et al., "A Direct Nonlinear Predictor–Corrector Primal–Dual Interior Point Algorithm For Optimal Power Flows", IEEE Transactions On Power Systems, pp. 138–145.

Lugtu, R., "Security Contrained Dispatch", IEEE Transactions on Power Apparatus and Systems, vol. PAS–98, No. 1, Jan./Feb. 1979.

Bacher, R., et al., "Security Dispatch Based On Coupling Of Linear And Quadratic Programming Techniques", IFAC Symposium Power Systems: Modelling And Control Applications, Brussels, Sep. 5–8, 1988.

(List continued on next page.)

Primary Examiner—Leo Picard
Assistant Examiner—Elliot Frank
(74) Attorney, Agent, or Firm—José R. de la Rosa (57) ABSTRACT

A Security-Constrained Optimal Power Flow (SCOPF) process employing a quadratic programming (QP) primal-dual interior point (IP) solution method. The IP method efficiently solves practical SCOPF problems involving large numbers of contingencies and controls in preventive and preventive/corrective operating modes. An EMS system is described incorporating the inventive SCOPF process. The SCOPF process can be used in a variety of additional arrangements including a locational marginal pricing scheme and a power transmission rights auction system. An infeasibility detection method is also described.

20 Claims, 2 Drawing Sheets

OTHER PUBLICATIONS

Bacher, R., et al., "Real–Time Optimal Power Flow In Automatic Generation Control", IEEE Transaction On Power Systems, vol. 3, No. 4, Nov. 1988.

Monticelli, A., et al., "Security–Constrained Optimal Power Flow With Post–Contingency Corrective Rescheduling", IEEE Transactions On Power Systems, vol. PWRS–2, No. 1, Feb. 1987, pp. 175–182.

Reid, G. F., et al., "Economic Dispatch Using Quadratic Programming", IEEE Transactions On Power Apparatus And Systems, vol. PAS–92, pp. 2015–2023, Nov./Dec. 1973, Depts. of Electrical Engineering of Virginia Military Institute and Virginia Polytechnic Institute and State University.

Lustig, I., et al., "Computational Experience With a Primal–Dual Interior Point Method For Linear Programming", Linear Algebra And Its Applications, 152:191–222, Elsevier Science Publishing Co., Inc., (1991), pp. 191–223.

Carpenter, T., et al., "Separable Quadratic Programming Via a Primal–Dual Interior Point Method and Its Use in a Sequential Procedure", ORSA Journal On Computing, vol. 5, No. 2, Spring 1993, pp. 182–191.

Lustig, I., et al., "On Implementing Mehrotra's Predictor-Corrector Interior–Point Method For Linear Programming", SIAM J. Optimization, vol. 2, No. 3, pp. 435–449, Aug. 1992.

Lu, C., et al., "Network Constrained Security Control Using An Interior Point Algorithm", IEEE Transactions on Power Systems, vol. 8, No. 3, Aug. 1993, pp. 1068–1076.

Lustig, I., "Feasibility Issues in a Primal–Dual Interior-Point Method for Linear Programming", Mathematical Programming, 49 (1991) 145–162, North–Holland.

Aganagic, M., et al., "Security Constrained Economic Dispatch Using Nonlinear", Dantzig–Wolfe Decomposition, IEEE Transactions on Power Systems, vol. 12, No. 1, Feb. 1997, pp. 105–112.

Ristanovic, P., "Successive Linear Programming Based Optimal Power Flow Solution", IEEE Tutorial Course, Optimal Power Flow: Solution Techniques, Requirements, and Challenges, presented at the 1996 IEEE Power Engineering Society Summer Meeting, Jul. 28–Aug. 1, 1996, IEEE Catalog No. 96 TP 111–0.

Wollenberg, B.F., et al., "A Real Time Optimizer For Security Dispatch", IEEE Transactions On Power Apparatus And Systems, vol. PAS–94, May, 1974, pp. 1640–1649.

Bertram, T., et al., "An Integrated Package for Real–Time Security Enhancement", IEEE Transactions on Power Systems, vol. 5, No. 5, May 1990, pp. 592–600.

Elacqua, A., et al., "Security Constrained Dispatch at the New York Power Pool", IEEE Transaction on Power Apparatus and Systems, vol. PAS–101, No. 8, Aug. 1982, pp. 2876–2883.

Scott, B., et al., "Review of Linear Programming Applied to Power System Rescheduling", 1979 Power Industry Computer Applications Conference, pp. 142–154.

Alsac, O., et al., "Further Developments in LP–Based Optimal Power Flow," IEEE Transactions on Power Systems, vol. 5, No. 3, Aug. 1990, pp. 697–711.

Bacher, R., et al., "Real–Time Optimal Power Flow in Automatic Generation Control", IEEE Transaction On Power Systems, vol. 3, No. 4, Nov. 1988.

Lu, C., et al., "Network Constrained Security Control Using An Interior Point Algorithm", IEEE Transactions on Power Systems, vol. 8, No. 3, Aug. 1993, pp. 1068–1076.

Aganagic, M., et al., "Security Constrained Economic Dispatch Using Nonlinear", Dantzig–Wolfe Decomposition, IEEE Transactions on Power Systems, vol. 12, No. 1, Feb. 1997, pp. 105–112.

Bertram, T., et al., "An Integrated Package for Real–Time Security Enhancement", IEEE Transactions on Power Systems, vol. 5, No. 2, May 1990, pp. 592–600.

Alsac, O., et al., "Futher Developments in LP–Based Optimal Power Flow," IEEE Transactions on Power Systems, vol. 5, No. 3, Aug. 1990, pp. 697–711.

*PJM Multi–Settlement System & FTR Auction Specification*, PJM Interconnection, L.L.C. (Mar. 19, 1998) Proprietary.

* cited by examiner

SECURITY CONSTRAINED OPTIMAL POWER FLOW METHOD

RELATED APPLICATIONS

The present application is related to and claims priority from U.S. Provisional Patent Applications Nos. 60/085,352, 60/085,240 and 60/085,364, filed on May 13, 1998.

FIELD OF THE INVENTION

The present invention relates to the field of electrical power generation and distribution systems.

BACKGROUND INFORMATION

Optimal power flow (OPF) algorithms based on successive linearization techniques are widely used to solve different problems in power system planning, operation and control.

Security Constrained OPF (SCOPF) problems are a special class of OPF problems which consider constraints derived from a normal system state (the "base case") and a set of predefined contingency states. SCOPF is an extension of the classical constrained economic dispatch problem in an effort to satisfy the system security requirements.

The definition of system security in actual power system operation varies throughout the power industry. Different operation policies and rules are applied to define security requirements. A widely accepted system security concept is so-called "n−1 security." Based on this concept, one of the main objectives in system operation and control is to keep the system in a normal state during normal system operation (the base case) and in the case of any one major contingency in the predefined list of contingencies. In order to satisfy the n−1 security criteria the power system should be secure (no violations) after the occurrence of any single contingency in the system. This leads to the implementation of preventive control actions in the system, or the preventive mode of SCOPF.

SCOPF in preventive mode is conservative, because it does not consider the system's post-contingency (corrective) control capabilities. By introducing corrective rescheduling to the n−1 security concept, three different modes of control adjustments that affect the SCOPF solution can be identified: 1) Preventive mode; 2) Corrective mode; and 3) Preventive/corrective mode.

In the preventive mode, all control variables are optimized such that no post-contingency adjustments are necessary in order to avoid violation of base case and post-contingency constraints. This is the most secure solution mode, since no operator intervention is required following an anticipated contingency. The consequences of such a solution are a higher pre-contingency objective function, and a generally more difficult problem to solve. In some cases the preventive mode solution may not even exist, especially for more severe contingencies.

In the corrective mode, the control variables are permitted to adjust after the contingency occurs. This is a less secure mode of operation since operator action is required soon after the occurrence of a contingency to reach an acceptable operating state. Such a problem is generally easier to solve, since there are more degrees of freedom in the control adjustments. The corrective mode is solved as a sequence of independent optimization problems, one per contingency.

In the preventive/corrective mode, some of the violations for the violated constraints are relieved in the preventive mode, and the rest in the corrective mode. The preventive/corrective mode SCOPF produces a significantly larger optimization problem to be solved than the preventive mode SCOPF. However, it is more likely to have a feasible solution than the preventive mode SCOPF. It should be the preferred solution mode, especially in those cases where the preventive mode SCOPF requires expensive rescheduling of the base case generations. Normally operating a power system at a much higher cost in order to avoid limit violations in some contingency cases, may not be justifiable considering that the problem can be avoided by combining preventive and corrective control actions.

Execution of the SCOPF function in any of the previously mentioned modes is time consuming. Historically, the performance problems are dealt with by introducing in the model a relatively small number of critical contingencies. This approximation presents an unresolved modeling problem for all known SCOPF formulations. That is, by fixing just a small subset of most critical contingencies, there is no guaranty that other contingencies labeled as non-critical will not become critical after a new SCOPF solution. The only practical solution to this problem is to directly involve a large number of critical contingencies in the SCOPF formulation, resulting in a very large optimization problem to be solved.

Many different solution approaches have been proposed to solve the OPF problem. These methods can be generally classified into the following two categories: 1) successive linear programming (SLP) based methods; or 2) non-linear programming (NLP) based methods.

In the past, the SLP-based methods have been used almost exclusively for the solution of Security Constrained Economic Dispatch (SCED) problems. This is due to an inability of NLP-based methods to efficiently solve large numbers of cases simultaneously. An approach for the solution of the CED problem with piecewise linear cost curves and regulating margin constraints has been developed by Lugtu and Elacqua et al. (See R. Lugtu, "Security Constrained Dispatch", *IEEE Transactions on Power Apparatus and Systems*, Vol. PAS-98, pp. 270–274, January/February 1979; and A. J. Elacqua, et al., "Security Constrained Dispatch at the New York Power Pool", *IEEE Transactions on Power Apparatus and Systems*, Vol. PAS-101, pp. 2876–2883, August 1982.) That approach is based on the differential algorithm and the simplex method.

One approach has been to formulate the CED problem as a quadratic programming optimization problem and solved using Wolfe's algorithm. (See G. F. Reid et al., "Economic Dispatch Using Quadratic Programming", *IEEE Transactions on Power Apparatus and Systems*, Vol. PAS-92, pp. 2015–2023, November/December 1973.) Furthermore, the Dantzig-Wolfe decomposition can be used efficiently for the solution of CED problems with reserve and contingency constraints. (See, e.g., M. Aganagic et al., "Security Constrained Economic Dispatch Using Nonlinear Dantzig-Wolfe Decomposition", *IEEE Transactions on Power Systems*, Vol. PWRS-12, pp. 105–112, February 1997.)

An efficient NLP-based implementation is described in A. Monticelli et al., "Security-Constrained Optimal Power Flow with Post-Contingency Corrective Rescheduling", *IEEE Transactions on Power Systems*, Vol. PWRS-2, pp. 175–182, February 1987. That approach is based on an AC power flow model and a generalized Benders decomposition. It is capable of solving SCOPF problems in both preventive and preventive/corrective modes.

Linear programming has been recognized as a reliable and robust technique for solving a large subset of specialized OPF problems characterized by linear separable objective functions and linear constraints. Many practical implementations of different OPF functions in modern energy management system (EMS) environments use an LP optimizer. Among various LP implementations probably the most efficient one is dual simplex successive linear programming with a special logic for traversing the segments of piecewise linearized cost curves called segment refinement. (See B. Stott et al., "Review of Linear Programming Applied to Power System Rescheduling", *IEEE PICA Conf. Proc.*, pp. 142–154, Cleveland, May 1979; Alsac et al., "Further Developments in LP-Based Optimal Power Flow", *IEEE Transactions on Power Systems*, Vol. PWRS-5, pp. 697–711, August 1990.) This method has been successfully implemented in solving general OPF problems including active loss minimization. It is very efficient in solving OPF problems with relatively small numbers of constraints and controls, which is not usually the case for SCOPF problems. The dual simplex LP algorithm and segment refinement are described in P. Ristanovic, "Successive Linear Programming Based OPF Solution", *IEEE Tutorial Course, Optimal Power Flow: Solution Techniques, Requirements, and Challenges*, 96 TP 111-0, 1996.

Interior point methods (IPMs) for mathematical programming problems were introduced by Frisch more than 30 years ago. Fiacco and McCormick further developed IPMs as a tool for the solution of nonlinear programming problems. (A. V. Fiacco et al., *Nonlinear Programming: Sequential Unconstrained Minimization Techniques*, John Wile & Sons, New York, 1955). Interest in IPMs has increased since Karmarkar's publication in 1984. (N. Karmarkar, "A New Polynomial-Time Algorithm for Linear Programming", *Combinator*, 1984). After Karmarkar's publication it has been shown that his method is just a special case of general logarithmic barrier methods. This has further focused attention on the development of logarithmic barrier methods. Extensive research in this area in the last ten years has proven that IPMs are competitive with the simplex method in solving very large linear problems.

An early application of IPMs to power system optimization problems is reported in C. N. Lu et al., "Network Constrained Security Control Using An Interior Point Algorithm", *IEEE Transactions on Power Systems*, Vol. PWRS-8, pp. 1068–1076, August 1993. The Constrained Economic Dispatch problem is solved using a successive linearization technique and a Primal Affine Scaling (PAS) interior point method. Test results on 6 to 118 bus systems verified good convergence and performance characteristics of PAS IPM. A Primal-Dual logarithmic Barrier algorithm has also been applied to general non-linear OPF problems.

It has been shown that Mehrotra's predictor-corrector method can efficiently solve large-scale OPF problems with up to 2423 buses. (S. Mehrotra, "On the Implementation of A Primal-Dual Interior Point Method", *SIAM J. Optimization*, Vol. 2, No. 3, 1992, pp. 575–601.) A similar formulation has been used to solve a large optimal reactive dispatch problem by a pure primal-dual logarithmic barrier method. (See S. Granville, "Optimal Reactive Dispatch Through Interior Point Method", *IEEE Transactions on Power Systems*, Vol. PWRS-9, pp. 136–146, February 1994.) A successive linear programming interior point method has been used to efficiently solve large SCED problems with up to 2124 buses.

SUMMARY OF THE INVENTION

The present invention provides a security-constrained OPF (SCOPF) process which employs a quadratic programming primal-dual interior point solution method. The present invention provides both preventive and preventive-corrective SCOPF.

The process of the present invention includes all of the favorable features of full non-linear optimization methods and successive linearization methods and has clear advantages over simplex-based OPF and SCOPF methods. An advantage of the process of the present invention is that its relative efficiency increases as the size of the optimization problem increases. This enables modeling of a very large number of contingencies and controls in SCOPF problems, allowing the solution of large preventive and preventive-corrective SCOPF problems in real-time. Another benefit is the accurate modeling of non-linear objective functions that may not be separable.

The process of the present invention provides for an efficient solution of highly non-linear OPF problems such as loss minimization, full optimization, voltage stability, and reactive SCOPF.

In an exemplary embodiment, the process of the present invention is efficiently used for bid evaluation and locational pricing and congestion management in deregulated energy markets. Other applications of the inventive process include OPF/SCOPF problems with discrete controls (LTCs, VCCs, VCRs, etc.) as well as security-constrained dynamic OPF (SCDOPF) problems.

A further exemplary embodiment of the present invention includes an infeasibility detection logic.

DETAILED DESCRIPTION

The typical SCOPF problem entails the solution of a set of non-linear equations which describe the optimal and/or secure operation of a power system. The general non-linear SCOPF problem can be expressed as:

$$\min F(x_d, x_c) \qquad (1)$$

$$\text{such that: } g_i(x_d, x_c)=0, i=0, \ldots, nc$$

$$h_i(x_d, x_c) \leq 0, i=0, \ldots, nc$$

$$x_c^{min} \leq x_c \leq x_c^{max}, i=0, \ldots, nc$$

where $g_i(x_d, x_c)$ is a set of non-linear equality constraints (e.g., power flow equations), $h_i(x_d, x_c)$ is a set of non-linear inequality constraints of vector arguments $x_d$ (dependent variables and fixed parameters) and $x_c$ (control variables), and nc is the number of simulated critical contingencies.

The non-linear optimization problem of Eq. 1 can be solved as a succession of linear approximations, i.e.:

$$\min F(x_d^o + \Delta x_d, x_c^o + \Delta x_c)$$

$$\text{such that: } g_i(x_d^o + \Delta x_d, x_c^o + \Delta x_c)=0, i=0, \ldots, nc$$

$$h_i(x_d^o + \Delta x_d, x_c^o + \Delta x_c) \leq 0, i=0, \ldots, nc$$

$$\Delta x_c^{min} \leq \Delta x_c \leq \Delta x_c^{max}, i=0, \ldots, nc$$

where:

$x_d^o$, $x_c^o$—Initial values of $x_d$ and $x_c$.

$\Delta x_c$, $\Delta x_d$—Shift about the initial point.

$g_i$, $h_i$—Linear approximations to the non-linear constraints.

Figure 1:
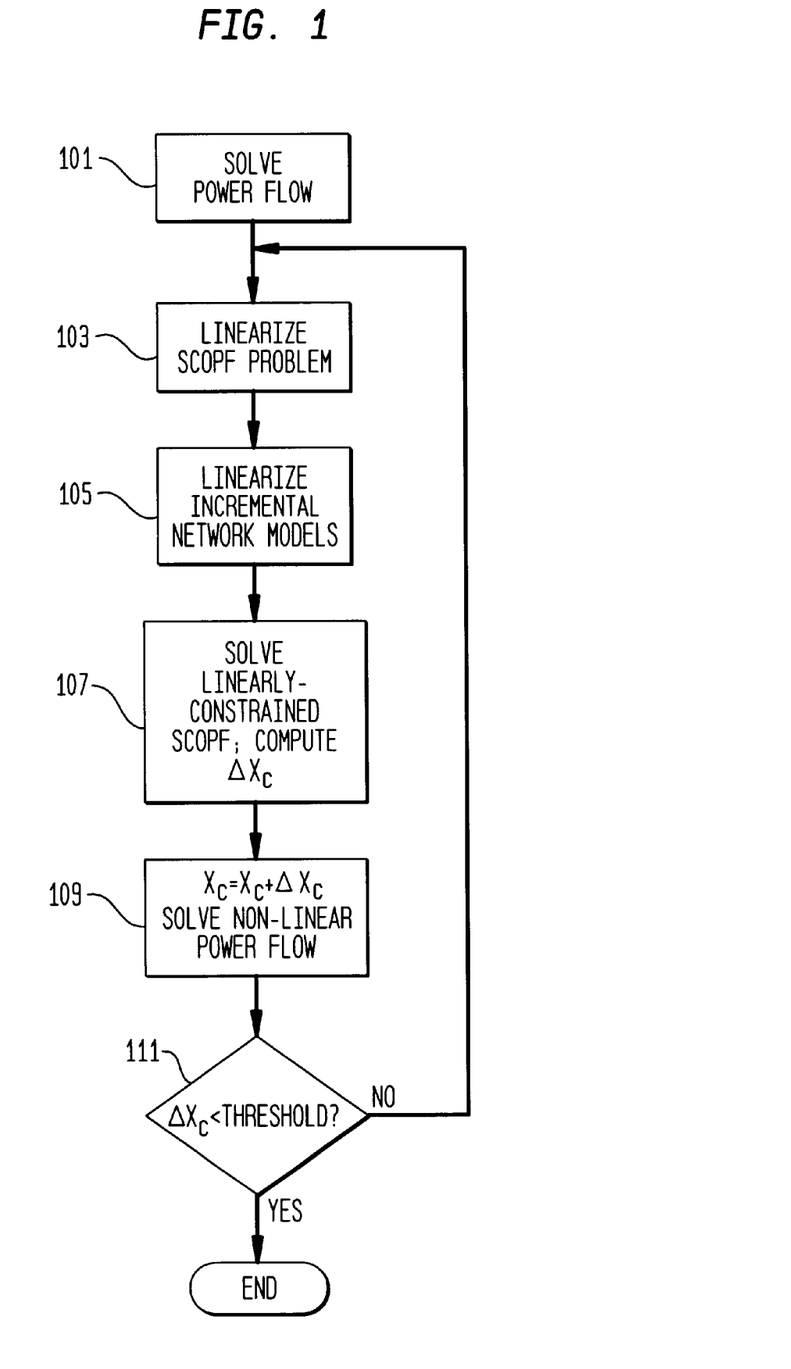
FIG. 1 is a flow chart of an exemplary SCOPF process in accordance with the present invention.

FIG. 1 is a high-level flow chart showing the major steps of an exemplary embodiment of a process in accordance with the present invention. At step 101 of the process of FIG. 1, the power flow problems for the base case and for each of a set of contingency cases are solved. At step 103, the SCOPF problem is linearized, i.e., the problem is expressed in terms of changes about the current system operating point. At step 105, the incremental network models for the base case and set of contingency cases are linearized. At step 107, the linearly-constrained SCOPF problem is solved by a quadratic programming primal-dual interior point method and the incremental control variables $\Delta x_c$ are computed. At step 109, the control variables $x_c=x_c+\Delta x_c$ are updated and the exact non-linear power flow problems for the base case and the set of contingency cases are solved. At step 111, if it is determined that the changes in the control variables computed in step 107 were below user-defined tolerances, it is determined that the solution has been reached. If not, operation loops back to step 103 and steps 103–111 are repeated.

The process of the present invention solves the network and tests operating limits in sparse form while performing the optimal rescheduling of control variables in non-sparse form.

The central optimization in the SCOPF process of the present invention is performed using a quadratic programming primal-dual interior point method. The only variables in the optimization process are the control variables, which are maintained within their limits by barrier penalty functions.

Preventive SCOPF

An exemplary embodiment of a preventive SCOPF process will now be described. At each main iteration of the preventive SCOPF process, the following optimization problem is formulated and solved:

$$\min 0.5\bar{x}^T Q\bar{x} + \bar{q}^T \bar{x}$$

such that: $A\bar{x}+B\bar{y}=\bar{c}$ (2)

$a_l \leq \bar{x} \leq a_u$ $b_l \leq \bar{y} \leq b_u$ $Q \in \Re^{n \times n} A \in \Re^{m \times n} \bar{x}, \bar{q}, a_l, a_u \in \Re^n$ $B \in \Re^{m \times m} \bar{c}, \bar{y}, b_l, b_u \in \Re^m$ Q is a positive semi-definite matrix. Substituting $\bar{x}=x+a_l$ and $\bar{y}=y+b_l$ in equation system 2 yields:

$$\min 0.5 x^T Q x + q^T x$$

such that: $Ax+By=\bar{c}-Aa_l-Bb_l=c$ (3)

$0 \leq x \leq a_u - a_l = a$ $0 \leq y \leq b_u - b_l = b$ $y,c,b \in \Re^m x,q,a \in \Re^n$ where $q^T = \bar{q}^T + a_l^T Q$. Adding slack variables to transform the upper bound inequalities to equalities, equation system 3 becomes $$\min 0.5 x^T Q x + q^T x$$

such that: $Ax+By=c$ (4)

$x+z=a$ $y+w=b$ $x,y,z,w \geq 0$ $w \in \Re^m$, $z \in \Re^n$

The corresponding dual quadratic problem is:

$$\max c^T \pi - a^T s - b^T t - 0.5 x^T Q x$$

such that: $A^T\pi+u-s-Qx=q$ (5)

$B^T\pi+v-t=0$ $u,s,v,t \geq 0$ $\pi,t \in \Re^m u,s \in \Re^n$ where the vector $\pi$ contains the dual variables corresponding to the rows of the matrix [A B]. Vectors u and s are the dual variables corresponding to the lower and upper bounds on the primal variables in the vector x. Similarly, vectors v and t are the dual variables corresponding to the lower and upper bounds on the primal variables in the vector y. By introducing a logarithmic barrier function to eliminate the inequality constraints from (4) and (5), with the barrier parameter $\mu>0$, the following equations characterizing the optimal solution of (4) and (5) yield:

$A^T\pi+u-s-Qx=q$ $B^T\pi+v-t=0$ $Ax+By=c$ $x+z=a$ $y+w=b$ (6)

$XUe=\mu e$ $YVe=\mu e$ $ZSe=\mu e$ $WTe=\mu e$ where X, U, Y, V, Z, S, W, and T are diagonal matrices with the elements $x_i$, $u_i$, $y_i$, $v_i$, $z_i$, $s_i$, $w_i$, and $t_i$, respectively. When $\mu=0$ these are precisely the optimality conditions for (4) and (5). The product terms, XU, YV, ZS and WT are nonlinear. The predictor-corrector solves the necessary conditions (6) by a direct approximation method. Let $\Delta x$, $\Delta y$ and so forth be the modifications required to the current solution x, y, z, w, s, t, u, v to solve for the current value of $\mu$, then:

$A^T\Delta\pi+\Delta u-\Delta s-Q\Delta x=d_1$ $B^T\Delta\pi+\Delta v-\Delta t=d_2$ $A\Delta x+B\Delta y=-d_c$ $\Delta x+\Delta z=d_a$ (7)

$\Delta y+\Delta w=d_b$ $X\Delta u+U\Delta x=\mu e - XUe - \Delta X\Delta Ue$ $Y\Delta v+V\Delta y=\mu e - YVe - \Delta Y\Delta Ve$ $Z\Delta s+S\Delta z=\mu e - ZSe - \Delta Z\Delta Se$ $W\Delta t+T\Delta w=\mu e - WTe - \Delta W\Delta Te$ where:

$$d_1 = q + Qx - A^T\pi + s - u \quad d_2 = -B^T\pi + t - v$$

$$d_c = Ax + By - c \quad d_a = a - x - z \quad d_b = b - y - w$$

In the equation system 7, ΔX, ΔY, ΔZ, ΔW, ΔS, ΔT, ΔU and ΔV are the diagonal matrices with entries $\Delta x_i$, $\Delta y_i$ and so forth. The second-order terms ΔXΔUe, ΔYΔVe, ΔZΔSe and ΔWΔTe prevent the system of equations 7 from being linear. These nonlinear terms are approximated (predicted) by solving a related system (technically known as the affine system) that omits both the nonlinear products and the $\mu$ term. This predictor step solution is:

$$\Delta\pi' = HH^{-1}[-d_c + A\Theta_1(\rho_1(0)+d_1) + B\Theta_2(\rho_2(0)+d_2)]$$

$$\Delta x' = \Theta_1[A^T\Delta\pi' - (\rho_1(0)+d_1)]$$

$$\Delta y' = \Theta_2[B^T\Delta\pi' - (\rho_2(0)+d_2)]$$

$$\Delta z' = -\Delta x' + d_a$$

$$\Delta w' = -\Delta y' + d_b \qquad (8)$$

$$\Delta s' = -Z^{-1}S\Delta z' - s$$

$$\Delta u' = -X^{-1}U\Delta x' - u$$

$$\Delta t' = -W^{-1}T\Delta w' - t$$

$$\Delta v' = -Y^{-1}V\Delta y' - v$$

where:

$$\rho_1(\mu) = \mu(Z^{-1} - X^{-1})e - (s-u) - Z^{-1}Sd_a$$

$$\rho_2(\mu) = \mu(W^{-1} - Y^{-1})e - (t-v) - W^{-1}Td_b$$

$$\Theta_1 = (Q + Z^{-1}S + X^{-1}U)^{-1}$$

$$\Theta_2 = (W^{-1}T + Y^{-1}V)^{-1}$$

$$HH = A\Theta_1 A^T + B\Theta_2 B^T$$

HH is a symmetric positive definite matrix. The values Δx', Δy', and so forth produced by this predictor step are checked for accuracy, and a step-length calculation is carried out to ensure that feasibility is preserved. With a separable objective function, the matrix Q is diagonal with nonnegative elements. This ensures that $\Theta_1$ is easy to compute as the inverse of a positive diagonal matrix.

To estimate $\mu$, a standard ratio test is performed on both the primal and dual variables to determine the step that would actually be taken if the primal-dual affine directions defined by equation system 8 were used. Thus:

$$\delta'_P = \min\{\min_j[-x_i/\Delta x'_i, \Delta x'_i < 0], \min_i[-z_i/\Delta z'_i, \Delta z'_i < 0],$$

$$\min_j[-u_i/\Delta u'_i, \Delta u'_i < 0], \min_i[-s_i/\Delta s'_i, \Delta s'_j < 0], 1\}$$

$$\delta'_D = \min\{\min_j[-y_j/\Delta y'_j, \Delta y'_j < 0], \min_j[-w_j/\Delta w'_j, \Delta w'_j < 0],$$

$$\min_j[-v_j/\Delta v'_j, \Delta v'_j < 0], \min_j[-t_j/\Delta t'_j, \Delta t'_j < 0], 1\}$$

$$\delta_P = 0.99995\delta'_P, \quad \delta_D = 0.99995\delta'_D, \quad \delta = \min(\delta_P, \delta_D)$$

Unlike the linear case, the primal variables now appear in the dual constraints. It is therefore not possible to use different primal and dual step lengths. This effectively limits the allowable step length to the minimum of the primal and dual step lengths. The complementarity gap is defined as $g = x^T u + y^T v + z^T s + w^T t$. The new complementarity gap that would result from a step in the affine direction is:

$$g' = (x + \delta\Delta x')^T(u + \delta\Delta u') + (y + \delta\Delta y')^T(v + \delta\Delta v') + (z + \delta\Delta z')^T(s + \delta\Delta s') + (w + \delta\Delta w')^T(t + \delta\Delta t')$$

In accordance with Mehrotra's method, an estimate for $\mu$, generalized to include lower bounds, is:

$$\mu = \left(\frac{g'}{x^T u + y^T v + z^T s + w^T t}\right)^2 \left(\frac{g'}{n}\right) \qquad (9)$$

which chooses a small $\mu$ when good progress can be made in the affine direction and a large $\mu$ when the affine direction produces little improvement.

Choosing $\mu$ in accordance with Eq. 9 can result in a numerically unstable system as the optimum is approached in case of poorly conditioned problems. Thus when the complementarity gap $g \geq 1$, $\mu$ is determined by Eq. 9. When $g < 1$, however, $\mu$ is defined as $\mu = g'/\Phi(n)$, where $\Phi(n) = n^2$ if $5000 \geq n$ and $\Phi(n) = n^{3/2}$ if $n > 5000$. The actual new step (corrector step) is then chosen as the solution to Equation system 7 where the nonlinear products and $\mu$ term are calculated based on the predictor step solution. This system is solved to obtain the corrected directions Δx, Δy, and so on. The solution is:

$$\Delta\pi = HH^{-1}\{-d_c + A\Theta_1[\rho_1(\mu) - \gamma'_1 + d_1] + B\Theta_2[\rho_2(\mu) - \gamma'_2 + d_2]\}$$

$$\Delta x = \Theta_1[A^T\Delta\pi - (\rho_1(\mu) - \gamma'_1 + d_1)]$$

$$\Delta y = \Theta_2[B^T\Delta\pi - (\rho_2(\mu) - \gamma'_2 + d_2)]$$

$$\Delta z = -\Delta x + d_a$$

$$\Delta w = -\Delta y + d_b \qquad (10)$$

$$\Delta s = Z^{-1}(\mu e - S\Delta z - \Delta Z'\Delta S'e) - s$$

$$\Delta u = X^{-1}(\mu e - U\Delta x - \Delta X'\Delta U'e) - u$$

$$\Delta t = W^{-1}(\mu e - T\Delta w - \Delta W'\Delta T'e) - t$$

$$\Delta v = Y^{-1}(\mu e - V\Delta y - \Delta Y'\Delta V'e) - v$$

where:

$$\gamma'_1 = Z^{-1}\Delta Z'\Delta s' - X^{-1}\Delta X'\Delta u'$$

$$\gamma'_2 = W^{-1}\Delta W'\Delta t' - Y^{-1}\Delta Y'\Delta v'$$

A new point is then calculated using the step length in the primal and dual spaces chosen to assure that the variables x, y, z, w, s, t, u, and v do not violate their bounds.

The overall method iteratively reduces $\mu$, and computes a set of optimal directions and steps to obtain a new approximation to the minimum. The value of $\mu$ at each iteration is based on the value of the duality gap. The iterative process continues until the duality gap satisfies the condition $g < \epsilon$ for a user-specified tolerance $\epsilon$.

Preventive/Corrective SCOPF

The formulation of Eq. 2 corresponds to the SCOPF problem in the preventive mode. When solving SCOPF in the preventive/corrective mode the following formulation is used:

$$\min 0.5\bar{x}_0^T Q_0 \bar{x}_0 + \bar{q}_0^T \bar{x}_0$$

such that: $A_0 N \bar{x}_0 \geq \bar{c}_0$ $$A_i(N\bar{x}_0 + \bar{x}_i) \geq \bar{c}_i, \quad i = 1, nc \qquad (11)$$

$$\bar{a}_{l,i} \leq \bar{x}_i \leq \bar{a}_{u,i}, \quad i = 0, nc$$

$Nl_s \leq N\bar{x}_0 + \bar{x}_i \leq N\bar{u}_s$, $i=1,nc$ $\bar{c}_i \in \mathcal{R}^m$ $\bar{q}_0$, $\bar{x}_0$, $\bar{i}_s$, $\bar{u}_s$, $a_{l,0}$, $\bar{a}_{u,0} \in \mathcal{R}^{n2}$ $\bar{x}_i$, $a_{l,i}$, $\bar{a}_{u,i} \in \mathcal{R}^{n1}$ $Q_0 \in \mathcal{R}^{n2 \times n2}$ $A_i \in \mathcal{R}^{m_i \times n1}$ $N \in \mathcal{R}^{n1 \times n2}$ where nc is the number of analyzed contingencies, n1 is the number of controls, n2 is the number of segments of the controls' cost curves, $m_0$ is the number of functional inequality constraints in the base case, and $m_i$ is the number of functional inequality constraints in the case of contingency i. N is the transformation matrix between corrective controls and artificial controls associated to their cost curve segments. This formulation provides for simultaneous cost minimization of the preventive control movements and a feasible solution of the base case and all of the critical contingency cases. The cost of the corrective control movements is not considered in the optimization.

Applying a transformation similar to the one applied above to the preventive SCOPF formulation, equation system 11 can be presented in the following compact matrix form:

$$\min q^T x + 0.5 x^T Q_x \quad (12)$$

such that: $APx + By = c$ $x + z = a$ $y + w = b$ $Kx - d = L$ $Kx + h = M$ $x, y, z, w, d, h \geq 0$ $A \in \mathcal{R}^{m \times N1}$ $B \in \mathcal{R}^{m \times n}$ $P, K \in \mathcal{R}^{N \times N2}$ $Q \in \mathcal{R}^{N2 \times N2}$ $c, y, w, b \in \mathcal{R}^m$ $q, x, a, z \in \mathcal{R}^{N2}$ $d, h, L, M \in \mathcal{R}^N$ $m = \sum_{i=0}^{nc} m_i$ $N = nc * n1$ $N1 = N + n1$ $N2 = N + n2$ The corresponding dual quadratic problem is:

$\max c^T \pi - a^T s - b^T t + L^T f - M^T g - 0.5 x^T Q x$ such that: $P^T A^T \pi + u - s - Qx + K^T(f-g) = q$ $B^T \pi + v - t = 0 \quad (13)$ $u, v, s, t, f, g \geq 0$ $v, t, \pi \in \mathcal{R}^m$ $u, s \in \mathcal{R}^{N2}$ $f, g \in \mathcal{R}^N$ The first order conditions required for optimality in Eqs. 12 and 13 are $P^T A^T \pi + \mu X^{-1} e - s - Qx + K^T(f-g) = q$ $B^T \pi + \mu Y^{-1} e - t = 0$ $ZSe = \mu e$ $WTe = \mu e$ $DFe = \mu e$ $HGe = \mu e \quad (14)$ $APx + By = c$ $x + z = a$ $y + w = b$ $Kx - d = L$ $Kx + h = M$ The predictor-corrector method solves the conditions 14 by a direct approximation method. The resulting HH matrix has the same size as in the preventive SCOPF formulation while the matrix $\Theta_1$ is not strictly diagonal as before. However, $\Theta_1$ is very sparse with a special structure enabling an efficient calculation of the matrix HH. As a result, despite a much larger number of controls, the computational requirements are not significantly higher than in the preventive SCOPF formulation.

Modeling and Implementation
SCOPF Objective Functions

The SCOPF problem formulation of Eq. 2 requires the objective function to be expressed as a set of convex, not necessarily separable, continuous quadratic and/or linear cost curves:

$$F = \Sigma(a_{0,i} + q_i x_i + 0.5 Q_i x_i^2), Q_i \geq 0 \quad (15)$$

The most common SCOPF objective functions are the active power production cost minimization and active power minimum control shift minimization. The cost curve of a generator is usually piecewise quadratic and represents its production cost. The generator cost curve is obtained from the corresponding piecewise linear incremental heat rate (IHR) curve. In addition, a cost curve can be a piecewise combination of quadratic and linear segments. The cost curve for an interchange transaction with an external company is similar to the generator cost curve. In deregulated energy markets, generation and load bids typically have piecewise linear price curves.

There is no direct economic cost associated with phase-shifters or load shedding. Thus, artificial quadratic cost curves are used for these controls. Such cost curves can be thought of as penalty functions; i.e., there is a penalty cost to be paid for moving these controls from their initial values.

The goal of the active power minimum control shift minimization objective function is to limit rescheduling of active power controls to the minimum amount necessary to relieve all constraint violations. This problem is similar to the cost optimization problem. The control variables that may be used and the constraints that are observed are similar to those in the cost optimization problem. The primary difference is in the cost curves for the generator MW outputs and for the interchange control variables. The control variables have cost curves defined as piecewise quadratic penalty terms. None of these control variables has an actual economic cost.

Another useful SCOPF objective function, especially for the real-time environment, is the minimum number of controls rescheduled. This objective function uses a linear "V" shaped curve for each control, with the zero value of cost at the target, the initial control value. All of the "V" shaped cost curves have the same slope. In an exemplary embodiment of the A present invention, this objective is handled using the following formulation:

$$F = \Sigma q_i (x_i^+ - x_i^-) \quad (16)$$

Network Model Linearization and Contingency Simulation

As shown in Eq. 2, the optimization problem that is solved at each iteration is a linear approximation to the actual optimization problem. Steps 103 and 105 of the exemplary SCOPF process of FIG. 1 correspond to forming the linear network model and expressing it in terms of incremental control variable changes about the initial operating point (i.e., "incrementalizing" the problem). Two main classes of contingencies are modeled in the network model linearization: 1) injection outages and 2) topology changes.

Contingent islands are an additional effect to be taken into account. For purposes of illustration, two contingencies, branch and unit outages, as well as the corresponding branch flow constraint sensitivity calculation will be described.

The incremental decoupled network equation is constructed by extending the fast decoupled active power flow equations:

$$\Delta p = B' \Delta \delta + S' \Delta \phi + D' \Delta p_d + A' \Delta p_a \quad (17)$$

The vector $\Delta p$ corresponds to all buses except the reference bus. The nonzero elements of this vector correspond to the controls being optimized. Matrix B' is the DC power flow matrix as used in a fast decoupled power flow (FDPF) procedure. For a phase-shifter in branch j, the relevant column of matrix S' contains $1/x_j$ and $-1/x_j$ in rows i and k, respectively. The corresponding column of matrix D', for a DC link in branch j, has +1 and −1 in rows i and k, respectively. For an interchange between the optimized company and an external company i, the relevant column of matrix A' contains the participation factors of the generators in company i, summed at the appropriate buses. In the case of topology changes caused by a contingency, the incremental active power flow in a branch from bus i to bus k is:

$$\Delta P_{ik} = \frac{r_{ik}^T (B' + \Delta B')^{-1} [\Delta p - (S' + \Delta S')\Delta \phi - (D' + \Delta D')\Delta p_d - A' \Delta p_a] + \Delta \phi_j}{x_j} \quad (18)$$

where $r_{ik}$ is a sparse vector with +1 and −1 in the ith and kth positions, $\Delta \phi_j$ is the incremental phase-shifter angle, and $x_j$ is the branch reactance. Eq. 18 is used to represent sensitivities of the branch flows with respect to the control variable changes. If the contingency does not involve a phase-shifter, the matrix S' does not change. Similarly, if the contingency does not involve a DC line outage, matrix D' does not change. The upper and lower active power constraints on the incremental branch flow at both ends are $$-P_{j,max} - P_j \leq \Delta P_{ik} \leq P_{j,max} - P_j \quad (19)$$

In the exemplary SCOPF process, only one side of this constraint is explicitly enforced. The other side of the constraint 19 is implicitly enforced using the upper limits on slack variables y. Additionally, the introduction of slack variables y provides for an efficient active set strategy by automatic relaxation of conflicting binding constraints during the optimization process. For transmission line corridor limits, the incremental flow limits are calculated in a similar way.

The lossless network model used for network model linearization dictates that the changes in the power balance equation with respect to each controlled generation is 1, i.e.

$$\Sigma \Delta P_{gi} + \Delta P_a - \Sigma \Delta P_{Lj} 0 = \quad (20)$$

where $\Delta P_L$ is the load shedding. Hence the sensitivity with respect to each controlled generator is 1. If, however, the transmission losses are considered, the equation above should be modified as follows:

$$\Sigma (\Delta P_{gi}/pfbi) + \Delta P_a - \Sigma \Delta P_{Lj} 0 \quad (21)$$

The sensitivity with respect to each controlled generator is 1/pfbi. In the preventive SCOPF process, one balance equation is added to the constraint matrix for the base case and for each contingency case involving outages of the optimized controls. In the preventive/corrective SCOPF process, the base case and each critical contingency case add the corresponding balance equation to the constraint matrix.

Generator outages and contingencies creating islands are simulated using the correct post-contingency redistribution of MW imbalances, including changes in losses. In addition, for generator outages, the limits on incremental control variable changes are appropriately adjusted. Contingency simulation accurately models the contingency cases involving the creation of new buses, bus types, and islands. Non-viable contingent islands are blacked out during the contingency simulation. Also, post-contingent MVAr limits are modeled correctly, since each contingency case is solved in the outer loop using full AC power flow solution. Time-limited controls are modeled by an appropriate adjustment of limits on control variable changes in both pre and post-contingency movements. Optionally, the allowed control movements can be derived from the amount of branch flow violations for each contingency. In the preventive-corrective SCOPF process it is possible to enforce a set of contingencies and corresponding violations to be relieved with preventive controls only.

Matrix Computations

Besides the contingency simulation, the largest amount of computation time in solving SCOPF problems in accordance with the present invention is expended in calculating and factorizing the dense symmetric positive semi-definite matrix HH. Its calculation is more expensive ($\approx m^2 n$) than its factorization ($\approx m^3 / 6$). The number of floating point operations for the calculation and factorization is essentially independent of the algorithm used and represents only part of the computation complexity. Since in both cases processing is done with relatively large dense matrices, it is desirable to take advantage of the features of modern computer architectures, including, among others, cache memory, pipelining, vectorization, and superscalar capabilities. Efficient use of these features can significantly enhance the performance of an IPM-based process.

An exemplary embodiment of a SCOPF process in accordance with the present invention is implemented in Fortran 90 and optimized for use on the superscalar architecture of a computer such as the IBM RS/6000. In this exemplary embodiment, the calculation of the matrix HH is done using the symmetric "gaxpy" version of matrix multiplication, described in G. H. Golub et al., *Matrix Computations,* The Johns Hopkins University Press, 1989. Factorization of the matrix HH is performed using the Cholesky factorization, which computes a lower triangular matrix L such that $HH = LL^T$. This can be implemented in different ways. In an exemplary embodiment, the outer product form of Cholesky factorization is used as it effectively exploits the cache memory of an IBM RS/6000. The Cholesky factorization is extremely stable numerically, without exhibiting any pivoting. Theoretically, a symmetric positive definite matrix has a Cholesky factorization. Conversely, if the Cholesky process runs to completion with strictly positive square roots, then HH is positive definite.

In a further exemplary embodiment, calculating and factorizing the matrix HH can be done with the use of parallel processors in SMP and MPP hardware architectures.

Sensitivity Analysis, Locational Pricing and Congestion Charges

The dual variables n, s, u, and v from Eq. 5 can be interpreted as derivatives of the objective function (Eq. 3) with respect to the corresponding system resources at the optimal solution. The dual variables are used to identify the critical constraints and other system resources that in a given operating situation have the highest marginal influence on the value of the objective function.

In the case of cost/price minimization, the dual variables can be used to derive an efficient locational pricing scheme, i.e. the set of nodal prices that would provide for an economically sound allocation of the cost of the power generation. More specifically, the efficient locational pricing scheme assigns a congestion charge $\pi^T a_i$ for each MW of power delivered at the node i, where $a_i$ is the ith column of the matrix A. Congestion charges are typically used for congestion management in deregulated power systems. Any generator delivering power to the node i would be compensated $q_i + Q_i x_i$ for each MW of produced power $x_i$. In addition, any upper limit constrained generator at the node i would be compensated $s_i a_i$. A positive value for $u_i$ would indicate the potential per unit benefit of having a negative generation at that node, i.e. of de-committing the corresponding generator. The transmission system operator would receive $c^T \pi$ because of the transmission congestion.

The output of the SCOPF process may be used to calculate marginal prices at load buses. For example, for a load bus k, the marginal price can be calculated as:

$$\lambda_k = \pi_r d_{k,r} + \sum_{i \in L} \pi_i s_{k,i} \qquad (22)$$

where $\pi_r$ is the marginal price of generation at the reference bus r, $d_{k,r}$ is the delivery factor which models the effect of transmission losses in delivering power from bus k to the reference bus, $\pi_i$ are marginal prices of active transmission constraints (i∈L), and $s_{k,i}$ are the sensitivities of the flows in constrained transmission lines with respect to the load at load bus k.

Interior Point Method Initialization

The predictor-corrector method is sensitive to the initial guess of the optimal solution. The solution method employed in the SCOPF process of the present invention belongs to the class of infeasible-interior-point methods. It does not require the initial point to be strictly feasible (interior), but requires that non-negativity conditions be strictly enforced for both primal and dual variables. In general, all the solution points generated during the iterative process are infeasible, although its limit points are feasible (and optimal). The algorithm approaches complementarity and feasibility simultaneously. An initial estimate to the primal and dual variables for the preventive SCOPF formulation can be chosen to be:

$$x^o = A^T H H^{-1} c \qquad y^o = B^T H H^{-1} c \qquad (23)$$

$$x_i^o = \min(\max(x_i^o, 0), a_i) \qquad y_j^o = \min(\max(y_j^o, 0), b_j)$$

$$\xi_1 = \max\left\{\min_{\substack{1 \le i \le n \\ 1 \le j \le m}} [(x_i, y_j), 100], \|c\|/100\right\} \qquad \xi_2 = 1 + \|q\|$$

where $\|\cdot\|$ is the $l_2$ norm. Then for each i=1,..., n and j=1,..., m $$x_i^o = \max(x_i^o, \xi_1) \quad z_i^o = \max(\xi_1, a_i - x_i^o)$$

$$y_j^o = \max(y_j^o, \xi_1) \quad w_j^o = \max(\xi_1, b_j - y_j^o)$$

the pair $u^o, s^o$ can be set to satisfy $$u_i^o = q_i + \xi_2 \quad s_i^o = \xi_2 \qquad \text{if } q_i \ge 0 \qquad (24)$$

$$u_i^o = \xi_2 \qquad s_i^o = \xi_2 - q_i \quad \text{if } -\xi_2 \le q_i < 0$$

$$u_i^o = -q_i \qquad s_i^o = -2q_i \quad \text{if } q_i < -\xi_2$$

and $v^o=1, t^o=1, \pi^o=0$.

For the preventive-corrective SCOPF formulation the initial point has the following additional settings:

$$f^o=1, g^o=1, d^o=\max(Kx^o - L, \epsilon), h^o=\max(M - Kx^o, \epsilon) \qquad (25)$$

Infeasibility Detection

Some SCOPF problems may be infeasible. For an efficient SCOPF implementation, it is desirable to be able to detect infeasibility and its potential cause in the early stage of the solution process. When infeasibility is detected it should be overcome, such as by increasing the number of controls, changing the objective function, and/or relaxing some of the constraints.

There are several alternative methods of detecting infeasibility in interior point methods. One approach is to embed the given problem in a slightly larger problem by introducing artificial variables and their attendant large costs. If at the solution point any of the artificial variables has a value greater than some tolerance, then the original problem is deemed infeasible. The choice of cost weighting factors for artificial variables may be difficult. In some cases, the weighting factors must be large and can cause numerical instability in the algorithm.

In accordance with an exemplary method of the present invention, two criteria for infeasibility detection are implemented. The first criterion is based on Farkas' lemma, which may be formulated as follows: the system $$Ax=c, \quad x \ge 0 \qquad (26)$$

is unsolvable (infeasible) if and only if the system $$\pi^T A \le 0, \quad c^T \pi > 0$$

is solvable. If Farkas' lemma is applied to Eq. 4, the following infeasibility conditions for a preventive SCOPF formulation result:

$$s - \pi^T A \ge 0 \quad t - \pi^T B \ge 0 \quad s, t \ge 0 \qquad (27)$$

$$c^T \pi - a^T s - b^T t > 0$$

In most infeasible cases the conditions 27 are satisfied in the early iterations of the optimization algorithm. In some cases, however, solution trajectory may not lead to the infeasible point satisfying these conditions. To capture these cases, an alternative infeasibility detection criterion is used as follows:

$$\max\{|s|, |\pi|, |t|\} > R \qquad (28)$$

where R is a very large number. This criterion detects infeasibility by checking the value of dual variables. In the case of infeasibility, the largest dual variable indicates the critical constraint causing the infeasibility. Similarly, the following infeasibility conditions for a preventive-corrective SCOPF formulation result from Eq. 12:

$$s - \pi^T A - (f^T - g^T) K \geq 0 \quad t - \pi^T B \geq 0 \quad s, t, f, g \geq 0 \qquad (29)$$
$$c^T \pi - a^T s - b^T t + L^T f - M^T g \geq 0$$
$$\max \{|s|, |\pi|, |t|, |f|, |g|\} > R$$

Integration within an Energy Management System

Figure 2:
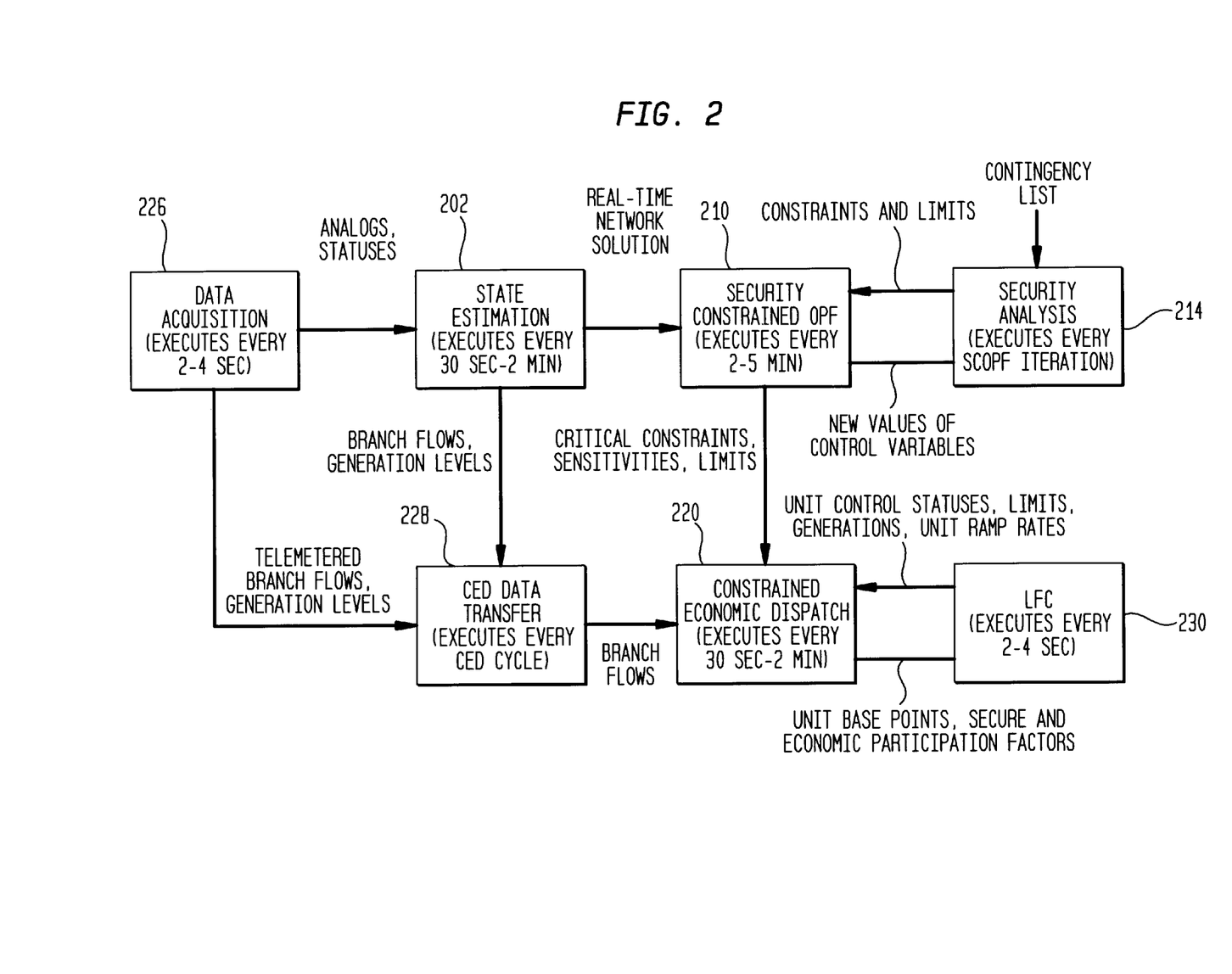
FIG. 2 is a functional block diagram of an exemplary real-time optimal secure active generation control system including a SCOPF function, in accordance with the present invention.

FIG. 2 shows a functional block diagram of an exemplary embodiment of a real-time optimal secure active generation energy management system (EMS) comprising the SCOPF process of the present invention.

The system of FIG. 2 comprises a State Estimation (SE) function 202, a Security Constrained OPF (SCOPF) function 210, a Security Analysis (SA) function 214, and a Constrained Economic Dispatch (CED) function 220. The SE function 202 retrieves the analog and digital measurements from a SCADA function 226 and executes at the scan rate (e.g., every 30 sec. to 2 min.) to produce a full real-time network solution. The real-time network solution is used by the SCOPF 210 and SA 214 to prepare critical constraints and related sensitivities and limits to be passed to the CED function 220. The operation and implementation of the SE, SA, CED and SCADA functions are well-known.

The SCOPF function 210 and SA function 214 execute in a loop until all of the violations resulting from the real-time evaluation of all contingencies listed in a contingency list are satisfied. The contingency list is typically provided by the operator (ISO) of the power system controlled by the EMS system. In this loop, the SA function 214 produces linearized binding constraints and limits for SCOPF processing, while the SCOPF function 210 calculates new control variable settings for evaluation by the SA function 210. In the exemplary EMS system, the SCOPF function 210 executes every 2–5 min and the SA function 214 executes for each iteration of the SCOPF function.

A CED Data Transfer function 228 obtains telemetered branch flows from the data acquisition function 226 and provides that data to the CED function 220, which in the exemplary embodiment of FIG. 2 executes every 30 sec to 2 min. The CED function 220 uses the telemetered branch flows and Critical Constraints (from the SCOPF function) to calculate new unit base points and secure/economic participation factors to be used by a Load Frequency Control (LFC) function 230. The LFC function uses the unit base points in the real-time dispatch of generation and provides the unit control statuses and limits, generations and unit ramp rates used by the CED function 220. The operation and implementation of the LFC function 230 are well-known.

In a further exemplary embodiment, the SCOPF process of the present invention can be used in a bid evaluation and locational marginal prices (LMP) calculation process, where the SCOPF and SA can be integrated with a Security Constrained Unit Commitment function. In this case, the ramping constraints of the generating units can be added to the SCOPF process, so that it becomes a security constrained dynamic OPF (SCDOPF) process. Similarly, a Fixed Transmission Right Auction (FTRA) process may be modeled as a SCOPF problem and solved using the SCOPF and SA engines. Such embodiments are described in U.S. patent application Ser. No. 09/272,471, entitled EXCHANGE, SCHEDULING AND CONTROL SYSTEM FOR ELECTRICAL POWER, which is filed on even date herewith and which is herein incorporated by reference in its entirety.

What is claimed is:

1. A security-constrained optimal power flow (OPF) method of operating a power system, comprising the steps of:

determining power flows for a base case operation and at least one contingency case operation of the power system;

linearizing an optimal power flow (OPF) problem formulation;

linearizing incremental network models for the base case and the at least one contingency case;

determining a solution based on the linearized OPF problem and the linearized incremental network models;

determining incremental control variables;

updating control variables with the incremental control variables;

determining power flows for the base case and the at least one contingency case using the updated control variables;

comparing the incremental control variables to a preselected threshold value and if the incremental control variables exceed the threshold, then repeating the previous steps; and controlling the power system in accordance with the control variables.

2. The method of claim 1, wherein the step of determining a solution includes performing a quadratic programming primal-dual interior point method.

3. The method of claim 1, wherein the step of determining a solution is based on a solution which prevents a violation under the at least one contingency case.

4. The method of claim 1, wherein the step of determining a solution is based on a solution which requires corrective action under the at least one contingency case.

5. The method of claim 1, comprising the step of determining locational marginal pricing.

6. The method of claim 1, comprising the step of detecting a solution infeasibility.

7. The method of claim 1, wherein the step of determining a solution includes respecting ramping constraints of power generating units.

8. A security-constrained optimal power flow (OPF) method of operating a power system, comprising the steps of:

determining power flows for a base case operation and at least one contingency case operation of the power system;

linearizing an optimal power flow (OPF) problem formulation;

linearizing incremental network models for the base case and the at least one contingency case;

determining a solution based on the linearized OPF problem and the linearized incremental network models, the solution requiring integrated preventive corrective action under the at least one contingency case;

determining incremental control variables;

updating control variables with the incremental control variables;

determining power flows for the base case and the at least one contingency case using the updated control variables;

comparing the incremental control variables to a preselected threshold value and if the incremental control variables exceed the threshold, then repeating the previous steps; and controlling the power system in accordance with the control variables.

9. The method of claim 8, wherein the step of determining a solution includes performing a quadratic programming primal-dual interior point method.

10. The method of claim 8, wherein the step of determining a solution is based on a solution which prevents a violation under the at least one contingency case.

11. The method of claim 8, wherein the step of determining a solution is based on a solution which requires corrective action under the at least one contingency case.

12. The method of claim 8, comprising the step of determining locational marginal pricing.

13. The method of claim 8, comprising the step of detecting a solution infeasibility.

14. The method of claim 8, wherein the step of determining a solution includes respecting ramping constraints of power generating units.

15. A security-constrained optimal power flow (OPF) method of operating a power system, comprising the steps of:

determining power flows for a base case operation and at least one contingency case operation of the power system;

linearizing an optimal power flow (OPF) problem formulation;

linearizing incremental network models for the base case and the at least one contingency case;

determining a solution based on the linearized OPF problem and the linearized incremental network models, the solution requiring integrated preventive corrective action under the at least one contingency case;

determining incremental control variables;

updating control variables with the incremental control variables;

determining power flows for the base case and the at least one contingency case using the updated control variables;

repeating the previous steps if a convergence test has not been satisfied; and controlling the power system in accordance with the control variables.

16. The method of claim 15, wherein the step of determining a solution includes performing a quadratic programming primal-dual interior point method.

17. The method of claim 15, wherein the step of determining a solution is based on a solution which prevents a violation under the at least one contingency case.

18. The method of claim 15, wherein the step of determining a solution is based on a solution which requires corrective action under the at least one contingency case.

19. The method of claim 15, comprising the step of detecting a solution infeasibility.

20. The method of claim 15, wherein the step of determining a solution includes respecting ramping constraints of power generating units.

* * * * *